(12) United States Patent
Cegalin et al.

(10) Patent No.: US 10,981,349 B2
(45) Date of Patent: Apr. 20, 2021

(54) ULTRA-LIGHTWEIGHT REINFORCED FLEXIBLE HOSE

(71) Applicant: FITT S.p.A., Sandrigo (IT)

(72) Inventors: Alessandro Cegalin, Vicenza (IT); Luca Battaglia, Bassano del Grappa (IT); Valentino Vigolo, Caldogno (IT)

( * ) Notice: Subject to any disclaimer, the term of this patent is extended or adjusted under 35 U.S.C. 154(b) by 0 days.

(21) Appl. No.: 16/614,359

(22) PCT Filed: Jun. 27, 2018

(86) PCT No.: PCT/IB2018/054743
§ 371 (c)(1),
(2) Date: Nov. 16, 2019

(87) PCT Pub. No.: WO2019/003130
PCT Pub. Date: Jan. 3, 2019

(65) Prior Publication Data
US 2020/0147920 A1 May 14, 2020

(30) Foreign Application Priority Data

Jun. 27, 2017 (IT) .................. 102017000071472

(51) Int. Cl.
*F16L 11/08* (2006.01)
*B32B 1/08* (2006.01)
(Continued)

(52) U.S. Cl.
CPC .............. *B32B 1/08* (2013.01); *B32B 5/026* (2013.01); *B32B 5/12* (2013.01); *B32B 7/022* (2019.01); *B32B 25/10* (2013.01); *B32B 25/14* (2013.01); *B32B 27/12* (2013.01); *B32B 27/302* (2013.01); *B32B 27/36* (2013.01); *B32B 27/40* (2013.01);
(Continued)

(58) Field of Classification Search
CPC .. F16L 11/10; F16L 11/08; B32B 1/08; B32B 5/026; B32B 2597/00; B32B 2307/536; B32B 2274/00
USPC ........ 138/123–126, 137, 140, 141; 428/36.9, 428/36.91
See application file for complete search history.

(56) References Cited

U.S. PATENT DOCUMENTS

| | | | | |
|---|---|---|---|---|
| 6,179,008 B1 * | 1/2001 | Kawazura | ................. | B32B 7/12 138/125 |
| 6,199,594 B1 * | 3/2001 | Mezzalira | ............ | D04B 21/205 138/130 |
| 6,390,141 B1 * | 5/2002 | Fisher | ................... | F16L 11/088 138/137 |
| 6,397,894 B2 * | 6/2002 | Leray | ..................... | F16L 9/121 138/125 |

(Continued)

FOREIGN PATENT DOCUMENTS

| | | |
|---|---|---|
| CA | 2708 | 12/2011 |
| WO | 2016097823 | 6/2016 |

*Primary Examiner* — Patrick F Brinson
(74) *Attorney, Agent, or Firm* — Themis Law

(57) ABSTRACT

An ultra-lightweight reinforced flexible hose for transporting fluids, in particular a flexible garden hose for transporting water, includes an inner tubular layer made of a first elastomeric or thermoplastic elastomer material; an outer cover layer made of a second elastomeric or thermoplastic elastomer material; and a reinforcement layer interposed between the inner layer and the outer layer. The reinforcement layer is made of a rigid or slightly elastic textile threads having, at least partially, a first and second predetermined inclination that are mutually opposite with respect to a longitudinal axis, each of the first and second inclinations being between 45° and 55° with respect to the longitudinal axis.

15 Claims, 1 Drawing Sheet

(51) Int. Cl.
*B32B 7/022* (2019.01)
*B32B 5/02* (2006.01)
*B32B 5/12* (2006.01)
*B32B 25/10* (2006.01)
*B32B 25/14* (2006.01)
*B32B 27/12* (2006.01)
*B32B 27/30* (2006.01)
*B32B 27/36* (2006.01)
*B32B 27/40* (2006.01)
*F16L 11/10* (2006.01)

(52) U.S. Cl.
CPC ............ *F16L 11/10* (2013.01); *B32B 2274/00* (2013.01); *B32B 2307/536* (2013.01); *B32B 2307/718* (2013.01); *B32B 2307/72* (2013.01); *B32B 2597/00* (2013.01); *F16L 11/08* (2013.01)

(56) References Cited

U.S. PATENT DOCUMENTS

| | | | | |
|---|---|---|---|---|
| 7,132,141 | B2* | 11/2006 | Thullen | B32B 1/08 428/36.91 |
| 8,895,124 | B2* | 11/2014 | Van Eibergen | F16L 11/12 428/36.91 |
| 2004/0134555 | A1* | 7/2004 | Powell | B32B 7/12 138/141 |
| 2007/0087150 | A1* | 4/2007 | Powell | B32B 27/36 428/36.9 |
| 2010/0104790 | A1* | 4/2010 | Blom | B32B 27/36 428/36.91 |
| 2012/0090720 | A1* | 4/2012 | Burrowes | B32B 5/26 138/124 |
| 2016/0146379 | A1 | 5/2016 | Latulippe | |
| 2017/0335999 | A1* | 11/2017 | Ochiai | F16L 57/06 |

\* cited by examiner

ULTRA-LIGHTWEIGHT REINFORCED FLEXIBLE HOSE

FIELD OF THE INVENTION

The present invention generally regards the technical field of flexible hoses, and it generally regards a reinforced flexible hose for transporting fluids, in particular a garden hose for transporting water.

DEFINITIONS

In the present document, the expression "textile yarn" or its derivatives is used to indicate an elongated thread-like element of any shape and made of any material, as long as the dimension of the length considerably prevails over. For example, the textile yarn may be a polymeric yarn, which may have a unitary structure or it may in turn consist of the joining of several elementary yarns, or a textile band of any shape.

In the present document, the expression "spiralled textile layer" or "spiralling" or its derivatives is used to indicate a layer consisting of a single yarn spiral-wound on the load-bearing layer with a predetermined pitch or groups of yarns spiral-wound on the load-bearing layer not superimposed on each other and preferably parallel.

In the present document, the expression "cross-hatched textile layer" or "cross-hatching" or its derivatives is used to indicate a layer consisting of at least two yarns or groups of yarns spiral-wound on the load-bearing layer with opposite inclinations and mutually superimposed but not connected. Thus, a cross-hatching is made up of two or more superimposed spirallings.

In the present document, the expression "knitted textile layer with chain stitches of the tricot type" and the like is used to indicate a layer consisting of at least two yarns or groups of yarns arranged on the load-bearing layer and mutually intertwined to form a plurality of chain stitches of the "tricot" type.

In the present document, the expression "chain stitches of the tricot type" and the like is used to indicate the portion of textile yarn (or a set of yarns grouped in a single yarn) which is intertwined with adjacent wires to form a generally annular-shaped loop.

In the present document, the expression "row of stitches" and the like of a knitted textile layer with chain stitches of the tricot type is used to indicate the line defined by the "chain stitches of the tricot type" concatenated to each other.

In the present document, the expression "courses of stitches" and the like of a knitted textile layer with chain stitches of the tricot type is used to indicate the portion of textile yarn (or set of yarns grouped into a single yarn) mutually connecting two consecutive "chain stitches of the tricot type" along the same yarn.

In the present document, the expression "compatible materials" or its derivatives is used to indicate materials chemically/physically compatible with each other, i.e. materials that, once coupled, form a joint suitable to support the transfer of pulling or cutting through the contact surfaces. Thus, the maximum compatibility will be observed in identical materials or materials having matrices of the same base.

In the present document, the expression "matrix" of a polymer or its derivatives is used to indicate a polymeric material capable of providing the molecular structure of the finished product.

In the present document, the expression "matrix based on" or its derivatives followed by the name of a given polymeric material is used to indicate a polymeric material capable of providing the molecular structure of the given polymeric material, whose name follows the phrase "matrix based on", to the finished product.

In the present document unless otherwise specified, the expression "inclination" or its derivatives of a layer consisting of textile threads or part thereof is used to indicate the inclination of the textile layer or part thereof with respect to the axis of the hose.

In the present document, unless otherwise specified, the expression "rigid textile threads" or its derivatives is used to indicate textile threads having an elongation at break— measured according to BISFA (Cap 7)—lesser than 10%, and preferably lesser than 7%.

In the present document, unless otherwise specified, the expression "slightly elastic textile threads" or its derivatives is used to indicate textile threads having an elongation at break—measured according to BISFA (Cap 7)—higher than 10% and lesser than 25%, and preferably lesser than 20%.

STATE OF THE ART

Reinforced flexible hoses, in particular irrigation hoses or garden hoses, including at least one inner layer or substrate, at least one outer layer or cover and at least one reinforced textile layer, are known.

The inner and outer layers are generally made of polymeric material, for example plasticised PVC, while the reinforcement layer consists of textile threads made of polymeric material, for example polyester.

In order to resist to the stresses due to the overlying layers, the inner layer usually has a greater hardness than the outer layer. Generally, the Shore A hardness of an inner layer amounts to 75-85, while the Shore A hardness of the outer layer amounts to 60-70.

Such known hoses have the renowned disadvantage of excessive weight per linear metre. This makes the hose poorly practical to handle and generally poorly appealing to the user.

As a matter of fact, whereas the polymeric materials the hose is made of confer good mechanical features on the one hand, they all have a considerably high density on the other hand, which translates into the aforementioned high weight.

SUMMARY OF THE INVENTION

An object of the invention is to at least partly overcome the drawbacks outlined above, by providing a reinforced flexible hose that is highly efficient and relatively economic.

Another object of the invention is to provide a ultra-lightweight reinforced flexible hose.

Another object of the invention is to provide a reinforced flexible hose with a good dimensional stability.

These and other objects that will be more apparent hereinafter, are attained by the reinforced flexible hose according to what is described, illustrated and/or claimed herein.

Advantageous embodiments of the invention are defined according to the dependent claims.

BRIEF DESCRIPTION OF THE DRAWINGS

Further characteristics and advantages of the invention will be more apparent in light of the detailed description some preferred but non-exclusive embodiments of the invention, illustrated by way of non-limiting example with reference to the attached drawings, wherein.

DETAILED DESCRIPTION OF A PREFERRED EMBODIMENT

Figure 2:
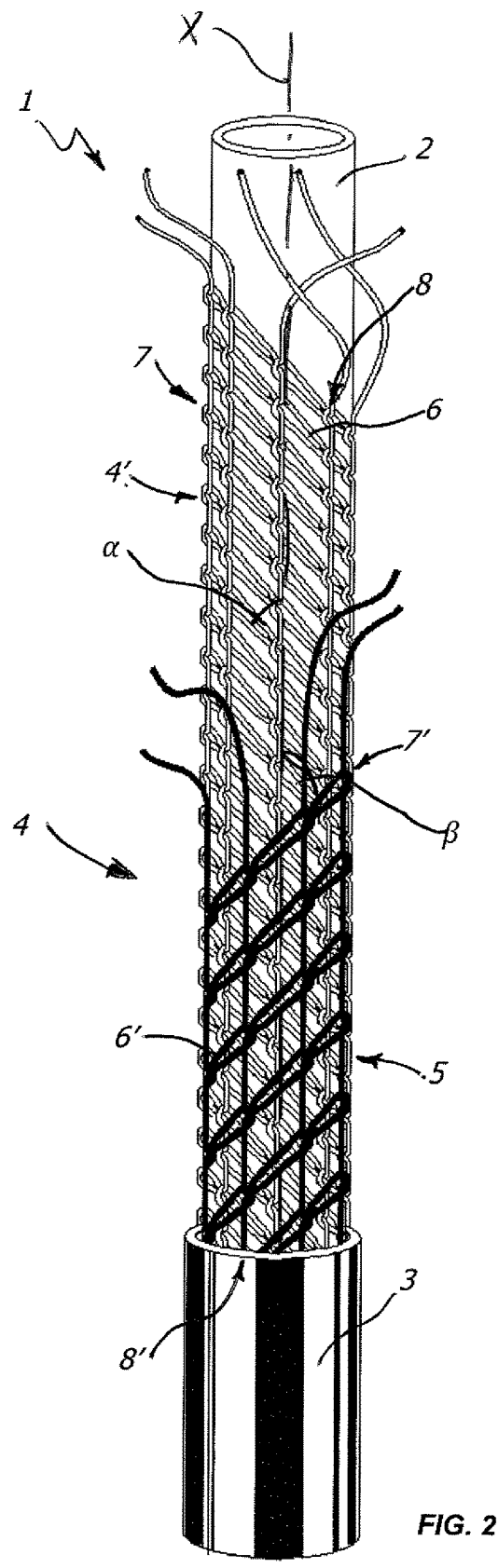
FIG. 2 is a schematic view of a second embodiment of the reinforced flexible hose 1.

With reference to the aforementioned figures, the flexible hose according to the invention, indicated in its entirety with reference number 1, may be particularly useful for transporting liquids in general. For example, the flexible hose 1 may be a garden hose or irrigation hose for transporting water, in particular potable water.

In a preferred but non-exclusive embodiment, the flexible hose 1 may consist of an inner tubular layer 2, which may for example be made of elastomer or thermoplastic elastomer, an outer cover tubular layer 3, which may for example be made of elastomer or thermoplastic elastomer and, interposed therebetween, one or more reinforcement layers 4, which may for example be made of polyester yarn.

It is clear that the reinforcement layer 4 may be arranged on the layer which supports it, for example on the inner layer 2, so as to leave the portions thereof—generally square-shaped, rectangular-shaped or rhomboid-shaped—free. Thus, the overlying layer, for example the outer layer 3, may be coupled with the underlying one, for example by means of gluing or melting materials if compatible, at such free portions.

In other words, the inner 2 and outer 3 tubular layers may be integrally joined to each other to define a unitary tubular element, the reinforcement layer 4 being embedded therein.

The inner tubular layer 2, which may define the axis X of the hose 1, may be designated to come into contact with the liquid to be transported, while the outer cover layer 3 may be designated to be grasped by a user.

Other additional layers, both textile and polymeric, may also be provided for between the various layers, without departing from the scope of protection outlined by the attached claims.

The elastomer or thermoplastic elastomer of the inner layer 2 and of the outer layer 3 may be selected from the group consisting of: vulcanised thermoplastic elastomers (TPE-V), polyurethane-based thermoplastic elastomers (PU), polyester-based thermoplastic elastomers (TPE-E), styrene-based thermoplastic elastomers (TPE-S).

For example, the material of the inner layer 2 and outer 3 layers may be a styrene-based thermoplastic elastomer (TPE-S) having a polypropylene-based matrix (PP), for example Nilflex® SH (Taro Plast SpA).

It is clear that the materials that the inner 2 and outer 3 layers are made of could be more or less the same without departing from the scope of the attached claims.

The materials of the inner 2 and outer 3 layers may preferably be mutually compatible.

The materials of the inner 2 and outer 3 layers may advantageously have a maximum Shore A hardness of 60 measured in accordance with the ASTM D 2240 (3") method. Thus, the materials will be soft to touch and particularly light.

More in particular, the material of the outer layer 3 may have a maximum Shore A hardness—measured in accordance with the ASTM D 2240 (3") method—of 60, and preferably a maximum Shore A hardness—measured in accordance with the ASTM D 2240 (3") method—of 55.

On the other hand, the material of the inner layer 2 may have a maximum Shore A hardness—measured in accordance with the ASTM D 2240 (3") method—of 60 Shore A, and preferably a maximum Shore A hardness—measured in accordance with the ASTM D 2240 (3") method—of 55 Shore A.

Preferably, the material of the inner layer 2 may have a maximum Shore A hardness—measured in accordance with the ASTM D 2240 (3") method—of 50 Shore A, and even more preferably a maximum Shore A hardness—measured in accordance with the ASTM D 2240 (3") method—of 45 Shore A.

The aforementioned hardness may be combined in any manner, without departing from the scope of protection of the attached claims.

For example, the material of the outer layer 3 may have a maximum Shore A hardness—in accordance with the ASTM D 2240 (3") method—of 55, while the material of the inner layer 2 may have a Shore A hardness—measured in accordance with the ASTM D 2240 (3") method—of 60 Shore A.

In another example, the material of the outer layer 3 may have a maximum Shore A hardness—in accordance with the ASTM D 2240 (3") method—of 50, while the material of the inner layer 2 may have a Shore A hardness—measured in accordance with the ASTM D 2240 (3") method—comprised between 45 and 55 Shore A.

Generally, the material of the outer layer 3 may have a Shore A hardness—measured in accordance with the ASTM D 2240 (3") method—comprised between 40 and 60, preferably a Shore A hardness—measured in accordance with the ASTM D 2240 (3") method—comprised between 45 and 60, and even more preferably a Shore A hardness—measured in accordance with the ASTM D 2240 (3") method—comprised between 50 and 60.

This enables obtaining a hose 1 with good resistance against abrasion, though with a material extremely soft to touch.

Suitably, the material of the inner layer 2 may have a maximum Shore A hardness—measured in accordance with the ASTM D 2240 (3") method—of 50, preferably comprised between 30 and 50 and even more preferably comprised between 35 and 45.

This will enable lightening the hose 1.

Advantageously, the material of the outer layer 3 may have a hardness higher than or equal to the hardness of the material of the inner layer 2, so as to obtain a very light hose capable of resisting against abrasion.

For example, in such hose the material of the outer layer 3 may have a maximum Shore A hardness—in accordance with the ASTM D 2240 (3") method—of 60, while the inner layer 2 may have a Shore A hardness—measured in accordance with the ASTM D 2240 (3") method—of 50 Shore A.

Suitably, the materials of the inner 2 and outer 3 layer may have a density lesser than 1.20 $g/cm^3$, preferably lesser than or equal to 1.05 $g/cm^3$.

In a preferred but non-exclusive embodiment, the inner layer 2 may have a thickness S2 comprised between 1.5 mm and 2.5 mm, and preferably comprised between 1.6 mm and 2 mm, while the outer layer 3 may be a film having a thickness S3 comprised between 0.05 mm and 0.5 mm, and preferably comprised between 0.1 mm and 0.4 mm.

Preferably, the outer layer 3 may obtained according to the disclosures outlined in the international patent application PCT/IB2014/067091.

Thanks to the characteristics outlined above, the flexible hose 1 will be particularly light and easy to use.

Furthermore, the materials used will be pleasant and soft to touch and they will avoid dirtying the hose when dragging it on wet grounds.

On the other hand, such materials under the internal pressure of the fluid transported by the hose would tend to dilate, extending and dilating the hose diametrically.

On the contrary, the reinforcement layer 4 is configured to oppose the dilation of such materials, so that the pressurised hose 1 is substantially inextensible.

In particular, the one or more reinforcement layers 4 may consist of rigid, i.e. non-elastic or slightly elastic textile threads, which may have an elongation at break—measured according to BISFA (Cap 7)—lesser than 25%, and a toughness—measured according to BISFA (Cap 7)—of at least 50 cN/tex.

Suitably, the rigid or slightly elastic textile threads may have at least partially one respective first and second predetermined inclination α, β mutually opposite with respect to the axis X.

Figure 1:
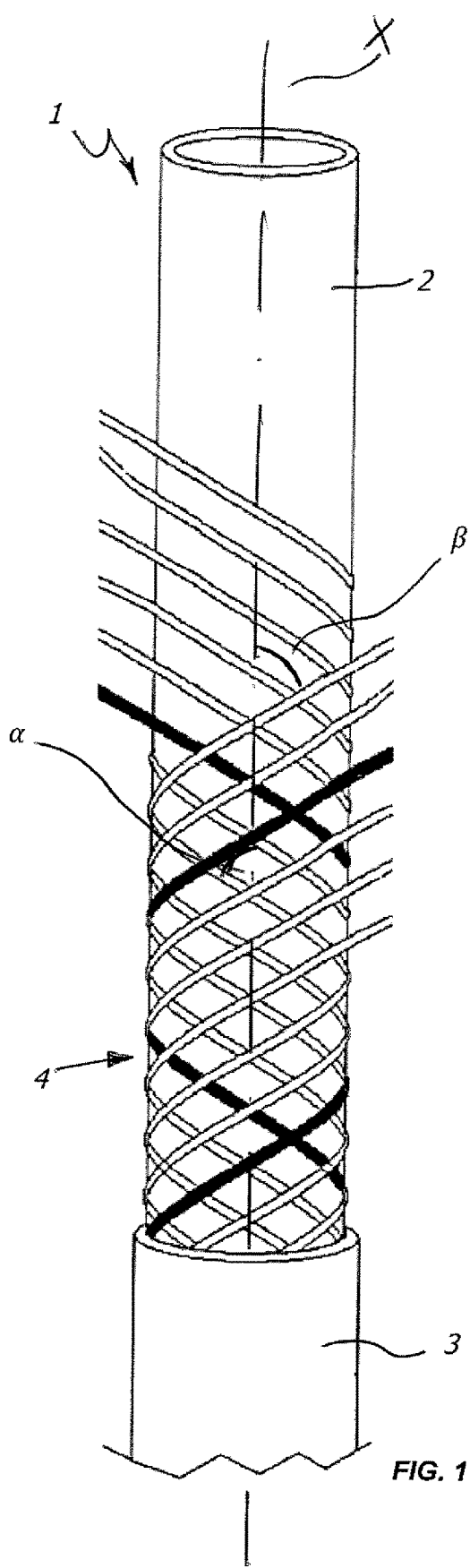
FIG. 1 is a schematic view of a first embodiment of the reinforced flexible hose 1.

For example, as illustrated in FIG. 1, in a first preferred but non-exclusive embodiment, the reinforcement layer 4 may be a braiding or double spiral.

In a further first preferred but non-exclusive embodiment, for example as illustrated in FIG. 2, the reinforcement layer 4 may be a double knitting with chain stitches of the tricot type obtained with plain stitch.

Advantageously, such double knitting may be obtained according to the disclosures provided for by the Italian patent application number 102017000002927, on behalf of the Applicant.

In such preferred but non-exclusive embodiment, the reinforcement layer 4 may include two textile layers 4', 5 of the knitted type with chain stitches of the tricot type, indicated with 6 for the first textile layer 4' and with 6' for the second textile layer 5. Both textile layers 4', 5 may have rows of stitches, indicates with 7 for the first textile layer 4' and with 7' for the second textile layer 5, and rows of stitches respectively indicated with 8, 8'.

The courses of stitches 8 of the first textile layer 4' may all be substantially parallel to each other, same case applying to the courses of stitches 8' of the second textile layer 5, and they may all be substantially parallel to the axis X of the hose 1.

The rows of stitches 7, 7' of the textile layers 4', 5 may instead have mutually opposite inclinations α, β with respect to the axis X of the hose.

On the other hand, in a further preferred but non-exclusive embodiment, such double knitting may have chain stitches of the tricot type obtained according to the disclosures of the European patent application no. EP0527512.

On the other hand, in a further preferred but non-exclusive embodiment, such double knitting may have chain stitches of the tricot type obtained with lock stitch, and it may for example be obtained according to the disclosures of the patent application no. EP0623776.

In order to avoid deformations of the flexible hose 1 due to the internal pressure, the first and the second inclination α, β may be comprised between 45° and 55° with respect to the axis X.

As a matter of fact, such inclination will enable the reinforcement layer 4 to effectively oppose the deformations caused by the internal pressure both in the axial and radial direction.

As a matter of fact, as mentioned above, without the reinforcement layer 4 configured as described above, under pressure the flexible hose 1 would tend to extend and expand considerably due to the relatively low hardness of the materials used.

More in particular, the inclinations α, β described above will enable to obtain a hose 1 capable—under the operating pressure of 2 bars—of increasing the maximum length thereof by 1.1 times with respect to the initial length thereof, i.e. the length of the hose with no fluid flowing through it, preferably the maximum of 1.05 times with respect to the initial length thereof.

Furthermore, the inclinations α, β described above will enable to obtain a hose 1 capable—under the operating pressure of 2 bars—of increasing the maximum inner diameter thereof by 1.1 times with respect to the initial inner diameter, preferably the maximum of 1.05 times with respect to the initial inner diameter.

Thus, thanks to the characteristics described above, the flexible hose 1 will be light and easy to handle, and it will simultaneously have a good dimensional stability.

In a per se known manner, the flexible hose 1 may be obtained by extruding the first elastomeric or thermoplastic elastomer material to obtain the inner 2, obtaining the reinforcement layer 4 above the latter and extruding the second elastomeric or thermoplastic elastomer material above the latter to obtain the outer layer 3.

In light of the above, it is clear that the invention attains the pre-set objectives.

The flexible hose 1 is susceptible to numerous modifications and variants all falling within the inventive concept outlined in the attached claims. All details can be replaced by other technically equivalent elements, and the materials can be different depending on the needs, without departing from the scope of protection defined by the attached claims.

The invention claimed is:

1. A reinforced flexible garden hose for transporting water, comprising:
    an inner tubular layer (2) defining a longitudinal axis (X) and adapted to come into contact with the water, said inner tubular layer (2) being made of a first elastomeric or thermoplastic elastomer material;
    an outer cover tubular layer (3) adapted to be grasped by a user and made of a second elastomeric or thermoplastic elastomer material; and
    a reinforcement layer (4) interposed between said inner layer (2) and said outer layer (3);
    wherein said reinforcement layer (4) consists of textile threads having at least partially a respective first and a second predetermined inclination (α, β) mutually opposite with respect to said longitudinal axis (X), each of said first and said second predetermined inclinations (α, β) being comprised between 45° and 55° with respect to said longitudinal axis (X), so as to oppose an extension and an expansion of the reinforced flexible garden hose under pressure;
    wherein said first and said second elastomeric or thermoplastic elastomer material have a density less than 1.05 g/cm$^3$; and
    wherein a hardness of said second elastomeric or thermoplastic elastomer material, measured according to ASTM D 2240 (3″) method, is higher than a hardness of said first elastomeric or thermoplastic elastomer material.

2. The reinforced flexible garden hose according to claim 1, wherein said first elastomeric or thermoplastic elastomer material has a maximum Shore A hardness, measured in accordance with the ASTM D 2240 (3″) method, of 55 Shore A.

3. The reinforced flexible garden hose according to claim 1, wherein said first elastomeric or thermoplastic elastomer material has a Shore A hardness, measured in accordance with the ASTM D 2240 (3") method, of 30 to 50.

4. The reinforced flexible garden hose according to claim 1, 2 or 3, wherein said second elastomeric or thermoplastic elastomer material has a Shore A hardness, measured in accordance with the ASTM D 2240 (3") method, comprised between 40 to 60.

5. The reinforced flexible garden hose according to claim 1, wherein said inner layer (2) has a thickness comprised between 1.5 mm and 2.5 mm, said outer layer (3) being a film having a thickness comprised between 0.05 mm and 0.5 mm.

6. The reinforced flexible garden hose according to claim 1, wherein said first and said second inclination ($\alpha$, $\beta$) are selected so that the reinforced flexible garden hose, when pressurized, is substantially inextensible.

7. The reinforced flexible garden hose according to claim 1, wherein said first and second predetermined inclinations ($\alpha$, $\beta$) are selected so that, under an operating pressure of 2 bars, the reinforced flexible garden hose increases a maximum length thereof by 1.1 times with respect to an initial length thereof.

8. The reinforced flexible garden hose according to claim 1, wherein said first and said second predetermined inclinations ($\alpha$, $\beta$) are selected so that, under an operating pressure of 2 bars, the reinforced flexible garden hose increases an inner diameter thereof by 1.1 times with respect to an initial inner diameter thereof.

9. The reinforced flexible garden hose according to claim 1, wherein one or both of said first or said second elastomeric or thermoplastic elastomer material is selected from the group consisting of: vulcanised thermoplastic elastomers (TPE-V), polyurethane-based thermoplastic elastomers (PU), polyester-based thermoplastic elastomers (TPE-E), or styrene-based thermoplastic elastomers (TPE-S).

10. The reinforced flexible garden hose according to claim 1, wherein said textile threads have an elongation at break, measured according to BISFA (Cap 7), that is less than 25%.

11. The reinforced flexible garden hose according to claim 1, wherein said textile threads have a toughness, measured according to BISFA (Cap 7), that is at least 50 cN/tex.

12. The reinforced flexible garden hose according to claim 1, wherein said inner tubular layer (2) and said outer cover tubular layer (3) are joined to each other to form a unitary tubular element, said reinforcement layer (4) being embedded in the outer cover tubular layer (3).

13. The reinforced flexible garden hose according to claim 1, wherein said reinforcement layer (4) is a braiding or a double spiral layer.

14. The reinforced flexible garden hose according to claim 1, wherein said reinforcement layer (4) is a double knitting layer with chain stitches of tricot type, of lock stitch type, or a plain stitch type.

15. The reinforced flexible garden hose according to claim 1, wherein said first and said second elastomeric or thermoplastic elastomer materials have a maximum Shore A hardness of 60 measured in accordance with the ASTM D 2240 (3") method.

\* \* \* \* \*